(12) United States Patent
Higuchi et al.

(10) Patent No.: US 11,529,944 B2
(45) Date of Patent: Dec. 20, 2022

(54) CONTROL METHOD FOR HYBRID VEHICLE AND CONTROL APPARATUS FOR HYBRID VEHICLE

(71) Applicant: Nissan Motor Co., Ltd., Yokohama (JP)

(72) Inventors: Shinsuke Higuchi, Kanagawa (JP); Hidekatsu Akiyama, Kanagawa (JP); Azusa Kobayashi, Kanagawa (JP); Keisuke Kawai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 266 days.

(21) Appl. No.: 16/772,591

(22) PCT Filed: Dec. 15, 2017

(86) PCT No.: PCT/JP2017/045222
§ 371 (c)(1),
(2) Date: Jun. 12, 2020

(87) PCT Pub. No.: WO2019/116588
PCT Pub. Date: Jun. 20, 2019

(65) Prior Publication Data
US 2020/0384977 A1  Dec. 10, 2020

(51) Int. Cl.
*B60W 10/26* (2006.01)
*B60W 20/14* (2016.01)
(Continued)

(52) U.S. Cl.
CPC ............ *B60W 20/14* (2016.01); *B60W 10/06* (2013.01); *B60W 10/08* (2013.01); *B60W 10/18* (2013.01);
(Continued)

(58) Field of Classification Search
CPC ...... B60W 10/06; B60W 10/08; B60W 10/26; B60W 10/18; B60W 20/14; B60W 2510/242; B60W 2540/12
See application file for complete search history.

(56) References Cited

U.S. PATENT DOCUMENTS 9,267,447 B2 *  2/2016  Morimura ............. F02N 11/084
9,457,798 B2 * 10/2016  Futatsudera .......... B60W 10/26
(Continued)

FOREIGN PATENT DOCUMENTS

JP  H07-279702 A  10/1995
JP  2009-137405 A   6/2009
(Continued)

*Primary Examiner* — Gonzalo Laguarda
(74) *Attorney, Agent, or Firm* — Young Basile Hanlon & MacFarlane, P.C.

(57) ABSTRACT

A control method for a hybrid vehicle including a generator and an electric motor, the generator being configured to charge a battery by use of power of an engine, the electric motor being configured to drive driving wheels by electric power of the battery, is provided, is provided. The control method having controlling the generator and the electric motor and accepting mode setting to set any of a normal mode, a regeneration driving mode, and a silent mode, the regeneration driving mode being a mode in which a regenerative braking force caused by the electric motor is larger than that in the normal mode, the silent mode being a mode in which charging by the engine is inhibited, wherein: when the normal mode is set, setting of the silent mode is not accepted; and when the regeneration driving mode is set, setting of the silent mode is accepted.

13 Claims, 4 Drawing Sheets

(51) Int. Cl.
  *B60W 10/06* (2006.01)
  *B60W 10/08* (2006.01)
  *B60W 10/18* (2012.01)
(52) U.S. Cl.
  CPC ... *B60W 2510/242* (2013.01); *B60W 2540/12* (2013.01)

(56) References Cited

U.S. PATENT DOCUMENTS

| | | | |
|---|---|---|---|
| 9,902,272 | B2 | 2/2018 | Sawada et al. |
| 2013/0184921 | A1 | 7/2013 | Ueno |
| 2021/0155218 | A1* | 5/2021 | Higuchi ................ B60L 50/61 |
| 2021/0213934 | A1* | 7/2021 | Higuchi ................ B60L 58/15 |

FOREIGN PATENT DOCUMENTS

| | | | |
|---|---|---|---|
| JP | 2011-093335 A | 5/2011 |
| JP | 4793233 B2 | 10/2011 |
| JP | 2012-086742 A | 5/2012 |
| JP | 2015-214265 A | 12/2015 |
| JP | 6233420 B2 | 11/2017 |

\* cited by examiner

CONTROL METHOD FOR HYBRID VEHICLE AND CONTROL APPARATUS FOR HYBRID VEHICLE

TECHNICAL FIELD

The present invention relates to a control method for a hybrid vehicle and a control apparatus for a hybrid vehicle.

BACKGROUND ART

Some electric vehicles in which wheels are driven by a motor drive a generator by an engine, the generator being configured to charge a battery serving as a drive source for the motor. Such electric vehicles are called series hybrid vehicles because the engine, the generator, the motor, and the wheels are connected in series. In recent years, as disclosed in JP 4793233 B, various driving modes suitable for traveling states have been developed so as to achieve improvement in fuel efficiency and operability. In terms of the series hybrid vehicles, similar mode development has been performed. Further, as disclosed in JP 6233420 B, such a vehicle has been developed that, when an accelerator position (accelerator opening degree) is small, a regenerative force is set to be large, and the regenerative force is applied until a vehicle speed becomes zero, so that start, traveling, and stop of the vehicle can be controlled only by an accelerator operation.

SUMMARY OF INVENTION

In the series hybrid vehicles, when a charging amount of the battery decreases, the engine is driven so that charging is performed by the generator. However, since a driving sound of the engine is larger than a driving sound of the motor, development of a technology in which a mode to restrain such a driving sound can be selected under an appropriate condition has been demanded.

According to a control method for a hybrid vehicle related to the present invention, the control method for a hybrid vehicle including a generator and an electric motor, the generator being configured to charge a battery by use of power of an engine, the electric motor being configured to drive driving wheels by electric power of the battery, is provided. The control method having controlling the generator and the electric motor and accepting mode setting to set any of a normal mode, a regeneration driving mode, and a silent mode, the regeneration driving mode being a mode in which a regenerative braking force caused by the electric motor is larger than that in the normal mode, the silent mode being a mode in which charging by the engine is inhibited, wherein: when the normal mode is set, setting of the silent mode is not accepted; and when the regeneration driving mode is set, setting of the silent mode is accepted.

DESCRIPTION OF EMBODIMENTS

With reference to drawings, the following describes an embodiment of the present invention.

Figure 1:
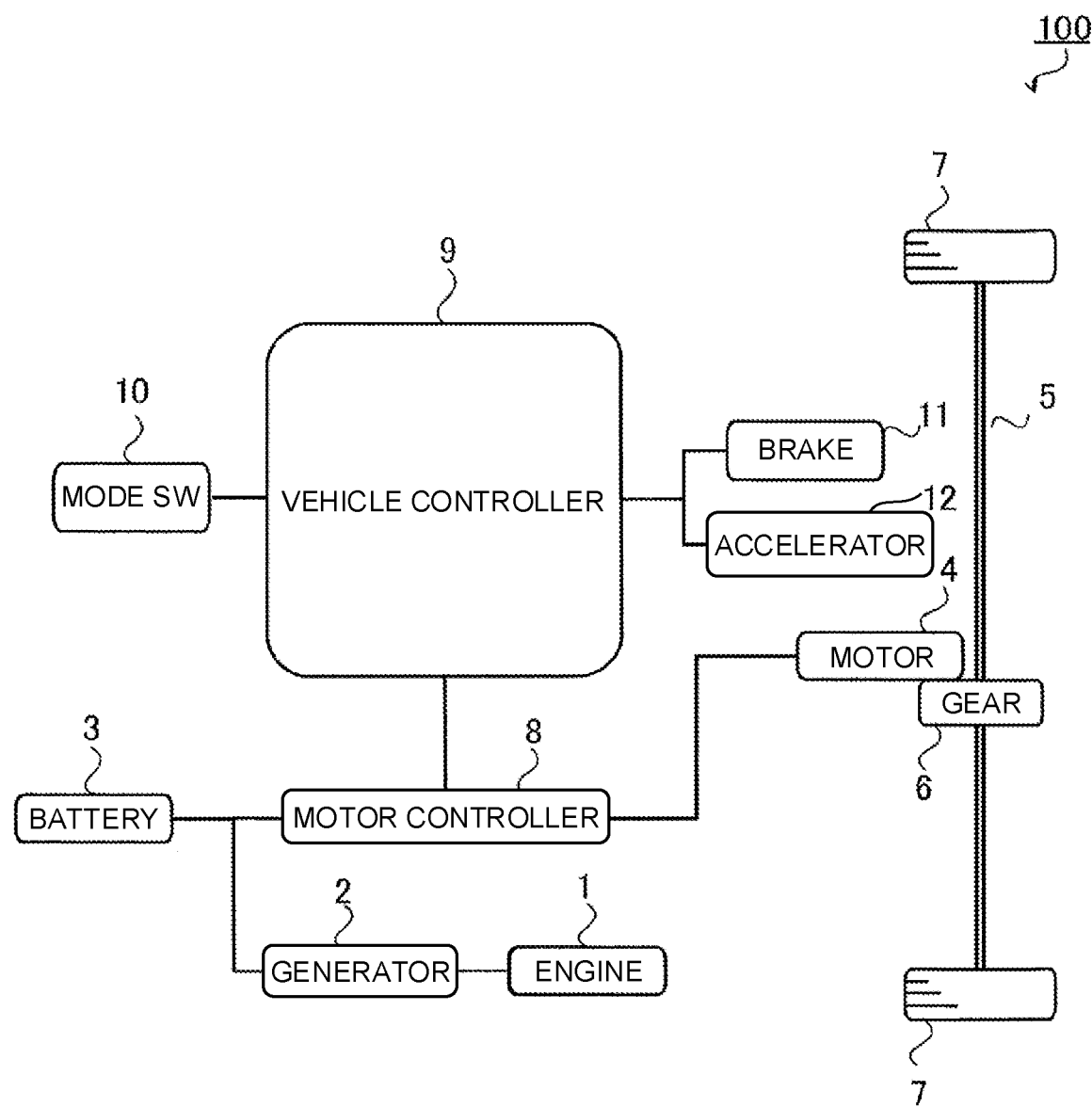
FIG. 1 is a block diagram illustrating a configuration of a hybrid vehicle according to the present embodiment.

FIG. 1 is a block diagram illustrating a configuration of a hybrid vehicle according to the embodiment of the present invention.

As illustrated in FIG. 1, a hybrid vehicle 100 includes an engine (internal combustion engine) 1, a generator 2, a battery 3, an electric motor 4, a gear 5, an axle 6, driving wheels 7, and a motor controller 8 for controlling a driving system of the hybrid vehicle 100. The hybrid vehicle 100 is provided as a so-called series-type hybrid vehicle configured to drive the driving wheels 7 such that electric power generated by the generator 2 by use of power of the engine 1 is supplied to the battery 3, and the electric motor 4 is rotated based on the electric power of the battery 3. Accordingly, in the hybrid vehicle 100, the power of the engine 1 is used not as a power source for causing the vehicle to travel but as a power source for causing the generator 2 to generate electric power.

The engine 1 is mechanically connected to the generator 2 via a speed reducer (not shown). The generator 2 is connected to the battery 3 in a power transmittable and receivable manner. Also, the battery 3 and the motor controller 8 are connected in a power transmittable and receivable manner, and the motor controller 8 and the electric motor 4 are connected in a power transmittable and receivable manner. The electric motor 4 is mechanically connected to the axle 6 via the gear 5, and the axle 6 is mechanically connected to the driving wheels 7.

A driving force of the engine 1 is transmitted to the generator 2, and the generator 2 generates electric power by the driving force of the engine 1. The electric power generated by the generator 2 is charged to the battery 3. The electric power of the battery 3 is transmitted to the electric motor 4 via the motor controller 8. The electric motor 4 is driven by the electric power of the battery 3. A driving force of the electric motor 4 is transmitted to the driving wheels 7 via the gear 5 and the axle 6. The driving wheels 7 are rotated by the driving force of the electric motor 4, so that the vehicle travels.

The hybrid vehicle 100 further includes a vehicle controller 9 for controlling the whole hybrid vehicle 100 including the motor controller 8, a mode switch 10 for alternatively selecting a plurality of driving modes, a brake hydraulic pressure sensor 11 for detecting a brake force, and an accelerator position sensor 12 for detecting an accelerator position. The vehicle controller 9 functions as a control apparatus according to the embodiment.

The vehicle controller 9 is electrically connected to the mode switch 10, the brake hydraulic pressure sensor 11, and the accelerator position sensor 12. The vehicle controller 9 receives a signal indicative of a selected driving mode from the mode switch 10, a signal indicative of a brake hydraulic pressure from the brake hydraulic pressure sensor 11, and a signal indicative of an accelerator position from the accelerator position sensor 12. The mode switch is constituted by two types of switches (not shown). One of the switches is a switch that can select a normal mode and an eco mode in a switchable manner, and the other one of the switches is a switch that can select a silent mode and a charge mode in a switchable manner. Details of the normal mode, the eco mode, the silent mode, and the charge mode will be described later.

The vehicle controller 9 is electrically connected to the motor controller 8. The vehicle controller 9 transmits a command torque to the motor controller 8. The vehicle controller 9 receives, from the motor controller 8, a signal indicative of a motor rotation speed of the electric motor 4 and a signal indicative of gradient information of a road on which the vehicle travels.

The vehicle controller 9 is achievable, for example, by a general-purpose microcomputer including a CPU (central processing unit), a memory, and an input-output portion. A computer program (a traction control program) to functionalize the microcomputer as the vehicle controller 9 is installed in the microcomputer and executed. Hereby, the general-purpose microcomputer functions as the vehicle controller 9. Note that the following describes an example in which the vehicle controller 9 is implemented by software. However, it is needless to say that the vehicle controller 9 can be constituted by preparing exclusive hardware to execute various information processes described below. Further, a plurality of units included in the vehicle controller 9 may be each constituted by individual hardware. Further, not only the vehicle controller 9, but also the motor controller 8 is achievable as software or exclusive hardware in a similar manner. Furthermore, the vehicle controller 9 and the motor controller 8 may further double as an electronic control unit (ECU) to be used for other controls for the vehicle.

Figure 2:
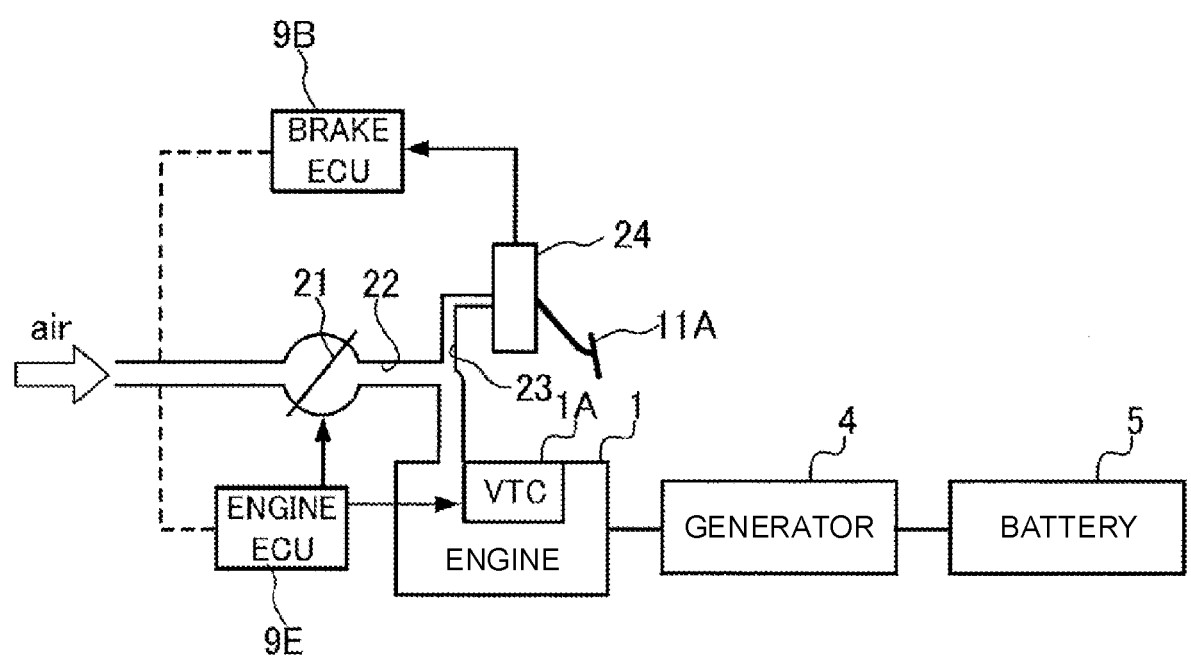
FIG. 2 is a view illustrating a configuration related to an engine 1.

FIG. 2 is a view illustrating a configuration related to the engine 1.

As has been described with reference to FIG. 1, the engine 1, the generator 2, and the battery 3 are directly connected to each other.

Fuel supplied from a fuel tank (not shown) is introduced into the engine 1 via an intake throttle 21, and the fuel is burnt by use of intake air flowing in the engine 1 via an intake passage 22. Further, a negative-pressure passage 23 branches from the intake passage 22 so as to be provided to be continuous with a brake booster 24.

The brake booster 24 is a device for assisting a brake pedal stepping force by a driver by use of intake negative pressure, of the engine 1, that is supplied from the negative-pressure passage 23. Due to a function of the brake booster 24, a stepping operation is assisted, so that a sufficient braking force can be obtained even when a brake pedal 11A is stepped on with a light force.

More specifically, when the intake throttle 21 is closed during the rotation of the engine 1, the intake passage 22 has negative pressure (its pressure becomes lower than atmospheric pressure), and the negative pressure is introduced into the brake booster 24 via the negative-pressure passage 23. The inside of the brake booster 24 is divided into two chambers by a diaphragm, and when the driver does not step on the brake pedal 11A, the negative pressure is introduced into both chambers.

When the driver steps on the brake pedal 11A, the atmospheric pressure is introduced only into the chamber on a pedal side, and a brake pedal force by the driver is assisted by a pressure difference caused between the chambers. On this account, in a case where the driver performs braking by the brake pedal 11A, both chambers of the brake booster 24 should have negative pressure to assist the brake pedal force. On this account, in a case where both chambers of the brake booster 24 do not have negative pressure at the time when the brake pedal 11A is stepped on, it is necessary to generate negative pressure such that the engine 1 is caused to idle by power running by driving the generator 2 by electric power of the battery 3 in a state where the intake throttle 21 is closed. Note that the idling of the engine 1 is called motoring.

Note that the brake booster 24 is connected to a brake ECU 9B as a part of the vehicle controller 9. The brake ECU 9B can detect pressure in the brake booster, and so on.

Further, the vehicle controller 9 also includes an engine ECU 9E, and the engine ECU 9E controls the intake throttle 21, a VTC (Variable Timing Control) 1A of the engine 1, and so on.

Here, the vehicle controller 9 controls the engine 1, the electric motor 4, and so on in accordance with a driving mode selected by the mode switch 10.

Figure 3:
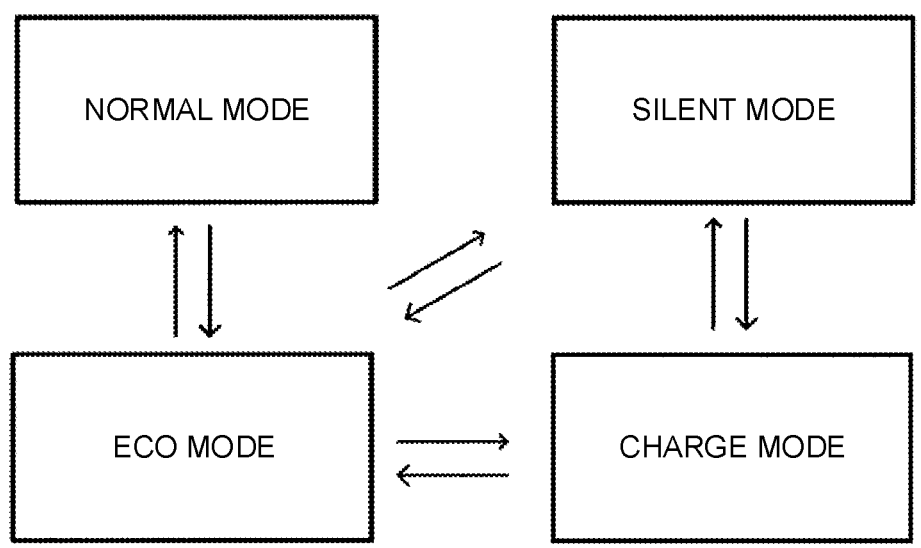
FIG. 3 is a view illustrating driving modes selectable by a mode switch 10.

FIG. 3 is a view illustrating driving modes selectable by the mode switch 10. These driving modes include the normal mode, the eco mode, the silent mode, and the charge mode. An arrow in the figure indicates that the driving mode is changeable from one mode to another mode. That is, when no arrow is described between two modes, these modes are not changeable from one to the other.

In a case where the normal mode is set, the motor controller 8 sets a regenerative braking force caused by the electric motor 4 to zero or to be relatively small so that coasting in a conventional gasoline engine is performable when an accelerator is released during traveling.

Meanwhile, in a case where the eco mode is set, the motor controller 8 performs a control such that an acceleration response to an accelerator operation is gradual and the regenerative braking force caused by the electric motor 4 is relatively large in comparison with a case where the normal mode is set. That is, in a case where the eco mode is set, when the accelerator position becomes small, the motor controller 8 causes the electric motor 4 to generate a regenerative braking force larger than a braking force corresponding to an engine brake. When the eco mode is set, an electric motor control similar to a control described in JP 6233420 B is performed. More specifically, as illustrated in FIG. 3 in JP 6233420 B, a regenerative torque at the time when an accelerator is released is large, and the regenerative torque is set to be generated until the vehicle speed becomes zero. That is, start and stop can be performed only by the accelerator operation.

In a case where the silent mode is set, the vehicle controller 9 does not drive the engine 1 and does not cause the generator 2 to generate electric power for the battery 3. In the silent mode, power generation by the engine 1 is not performed, so that no engine sound is caused. Accordingly, the silent mode is suitable for traveling in a residential area and so on.

In a case where the charge mode is set, the vehicle controller 9 drives the engine 1 and causes the generator 2 to generate electric power for the battery 3. In a case where the charge mode is set, power generation by the generator 2 by the driving force of the engine 1 is performed preferentially so that a charging amount of the battery 3 reaches a reference value. The charge mode is assumed to be used to increase the charging amount of the battery 3 in advance before the eco mode to stop the engine 1.

The vehicle controller 9 regularly accepts a change between the normal mode and the eco mode in response to an operation of the mode switch 10. Meanwhile, as for the silent mode and the charge mode, the vehicle controller 9 is configured to accept a change to those modes only in a case where the eco mode is set. The reason why the silent mode and the charge mode are selectable only in a case of the eco mode is as follows.

In a case where the eco mode is selected, active regenerative braking is performed. In the meantime, in a case where the normal mode is selected, regenerative braking by the electric motor 4 is relatively inhibited. In a case where the silent mode in which driving of the engine 1 is inhibited is selected, it is desirable to perform regenerative braking actively so as to prevent a decrease in the charging amount of the battery 3. Accordingly, the silent mode is selectable only in a case of the eco mode in which active regenerative braking is performed.

Further, in a case where the charge mode is set, the engine 1 is driven actively, so that the charging amount of the battery 3 is increased. Such a charge mode should be performed at a stage before charging by the engine 1 is inhibited like the silent mode. On this account, the charge mode is selectable only in the eco mode in which the silent mode is selectable. Thus, an integral operation of the silent mode and the charge mode is performable.

Figure 4:
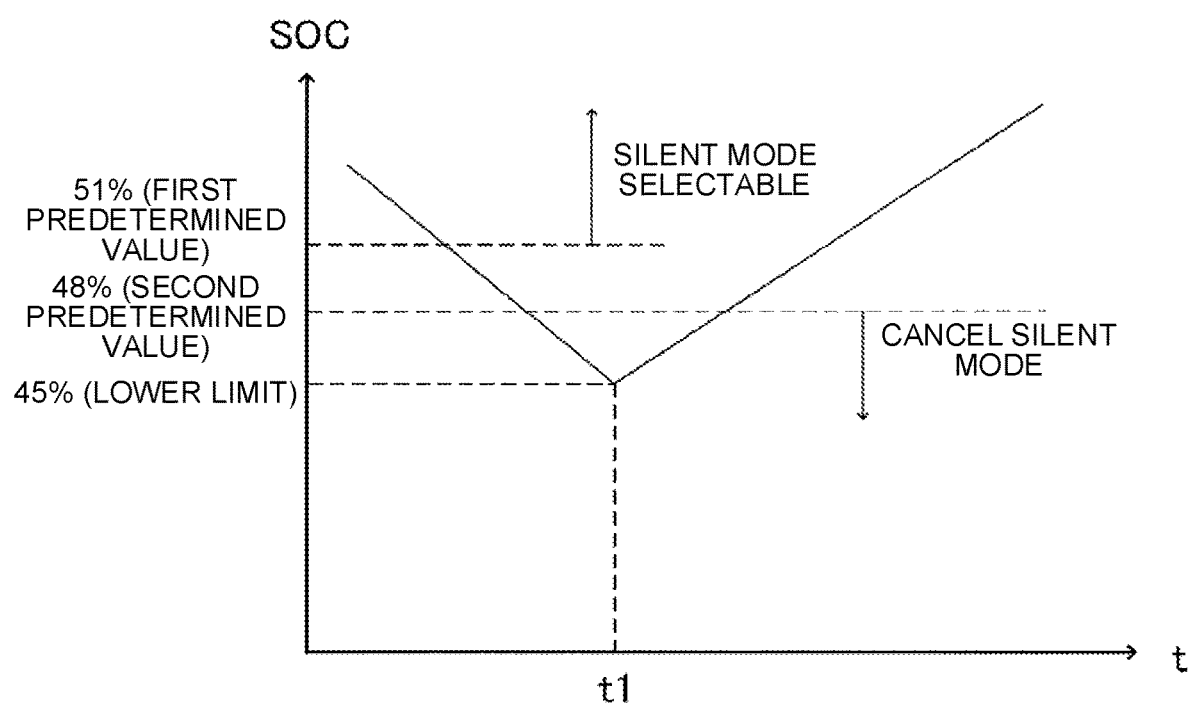
FIG. 4 is a graph illustrating a relationship between a charging amount of a battery and time when a normal mode or an eco mode is selected.

Further, the motor controller 8 performs a control illustrated in FIG. 4.

FIG. 4 is a graph illustrating the charging amount (SOC) of the battery 3 and time t in a case where the normal mode or the eco mode is selected. The charging amount is indicated by the vertical axis, and the time is indicated by the horizontal axis.

In the hybrid vehicle 100 as described in the present embodiment, the battery 3 is charged by power generation by the engine 1 and regenerative braking by the electric motor 4. The charging amount of the battery 3 decreases depending on an operating state. Accordingly, when the charging amount of the battery 3 becomes lower than 45% (a lower limit), the motor controller 8 drives the engine 1 so as to start charging of the battery 3 by the generator 2. When the charging amount of the battery 3 reaches 60%, for example, the motor controller 8 stops the engine 1 so as to stop the charging of the battery 3. Note that such a power generation control is performed in a case where the normal mode or the eco mode is selected.

A relationship between the change to the silent mode and the charging amount of the battery 3 in a case where the eco mode is set is as follows. When the SOC exceeds a first predetermined value (a silent mode allowable threshold) that is 51%, for example, the motor controller 8 allows selection of the silent mode. Meanwhile, when the SOC becomes lower than a second predetermined value (a silent mode cancellation threshold) that is 48%, for example, the motor controller 8 cancels the set silent mode and sets the eco mode again.

As described above, 45% as the lower limit is a threshold to start charging by use of the engine 1 when the charging amount of the battery 3 becomes low. When the lower limit is small, the hybrid vehicle 100 is likely to become unable to travel. Meanwhile, when the lower limit is large, the frequency of charging is likely to increase. Accordingly, the lower limit is set in consideration of a balance between them.

Further, 48% as the second predetermined value (the silent mode cancellation threshold) is a value set with a margin so that power generation by the engine 1 is not started immediately when the silent mode in which the engine 1 is not driven is cancelled. If the second predetermined value is 45% that is the same as the lower limit, the engine 1 is driven to start charging immediately after the silent mode is cancelled. In order to restrain such driving of the engine 1, the second predetermined value is set to be higher than the lower limit only by 3%.

Note that the value of 3% is determined as follows. That is, the value is set so that charging by driving of the engine 1 is not started immediately even if the accelerator pedal is stepped on harder after the silent mode is cancelled to shift to the eco mode. More specifically, a decrease in the charging amount of the battery 3 is assumed to be 3% in a case where strong acceleration is performed to accelerate from 20 km/h to 50 km/h by a predetermined acceleration (0.3 G), for example. Under such a condition, 48% that is larger than 45% as the lower limit only by 3% is set as the second predetermined value. In a case where the second predetermined value is set as such, even if stronger acceleration is performed, the charging amount of the battery 3 does not become lower than the lower limit (SOC: 45%), thereby making it possible to restrain driving of the engine 1.

Here, 51% as the first predetermined value (the silent mode allowable threshold) is set to be higher than 48% as the second predetermined value only by 3%. The value of 3% is set as follows. In the silent mode, silent traveling is performable because the engine 1 stops, and therefore, the driver selects the silent mode in the neighborhood of his or her house. Statistically, a distance between a main road to the house is 300 meters, and a necessary charging amount of the battery 3 to travel 300 meters is 3%. In view of this, 51% that is larger than 48% as the second predetermined value only by 3% is set as the first predetermined value. In a case where the first predetermined value is set as such, the charging amount does not become lower than 48% until the driver reaches his or her house. This accordingly restrains such a situation that the silent mode is cancelled before the driver reaches his or her house.

Note that the values described in the above embodiment are just examples, and the present invention is not limited to these values.

A sport mode may be also included in addition to the above modes. The sport mode is a mode in which regenerative braking is performed more frequently than the normal mode similarly to the eco mode and is a mode in which the responsiveness of the accelerator is higher than that in the normal mode and driving performance is raised. Accordingly, the eco mode and the sport mode in which regenerative braking is performed more frequently than the normal mode may be referred to as a regeneration driving mode.

Note that the present embodiment is described by use of an example in which the engine 1 is not driven in the silent mode, but the present invention is not limited to this. The silent mode may be configured such that the driving sound of the engine 1 is reduced by rotating the engine 1 at a low rotation speed. By driving the engine 1 at a low power output, the function of the silent mode can be also implemented.

According to the present embodiment, it is possible to yield the following effects.

In the control method for the hybrid vehicle according to the present embodiment, the hybrid vehicle 100 as a series hybrid vehicle in which the battery 3 is charged by use of a driving force of the engine 1 is configured to accept mode setting of the normal mode, the regeneration driving mode (the eco mode and the sport mode), and the silent mode. When the regeneration driving mode is selected, the silent mode can be accepted, but when the normal mode is selected, the silent mode is not accepted.

Since active regenerative braking is performed when the regeneration driving mode is selected, the charging amount of the battery 3 easily increases as compared to the normal mode. In a case where the silent mode in which driving of the engine 1 is inhibited is to be selected, the battery 3 is not to be charged, and therefore, it is preferable to be in the regeneration driving mode in which the charging amount of the battery 3 is high at the time when the silent mode is set and regenerative braking is performed actively. Accordingly, setting of the silent mode is accepted only when the regeneration driving mode is selected.

In the control method for the hybrid vehicle according to the present embodiment, the charge mode is further selectable. In the charge mode, the engine 1 is driven actively to increase the charging amount of the battery 3. Such a charge mode should be performed at a stage before charging of the battery 3 by the engine 1 is inhibited like the silent mode. On that account, the charge mode is selectable only in the eco mode in which the silent mode is selectable. This can achieve an integral operation of the silent mode and the charge mode, so that drivability can be improved.

In the control method for the hybrid vehicle according to the present embodiment, the negative-pressure passage 23 branching from the intake passage 22 of the engine 1 is provided. Negative pressure generated when the intake throttle 21 provided in the intake passage 22 is closed is supplied to two chambers of the brake booster 24 via the negative-pressure passage 23. A stepping operation on the brake pedal 11A is assisted by the negative pressure of the brake booster 24.

In a case where the brake pedal 11A is stepped on, if the two chambers of the brake booster 24 do not have negative pressure, the engine 1 should be operated to generate negative pressure. Here, it is assumed that the brake pedal 11A is stepped on in a state where the two chambers of the brake booster 24 do not have negative pressure and the engine 1 is not driven. In this assumption, it is necessary to cause the engine 1 to perform power running (a motoring control) by driving the generator 2 by use of the battery 3 in a state where the intake throttle 21 is closed. However, at the time of the motoring control, a rotational sound of the engine 1 might be caused.

Here, in the eco mode in which regenerative braking is performed more frequently than the normal mode, the operation by the brake pedal 11A is not performed comparatively. In view of this, when the silent mode is selectable only in the eco mode, it is possible to restrain motoring caused when the brake pedal 11A is stepped on, thereby making it possible to maintain silence of the hybrid vehicle 100.

In the control method for the hybrid vehicle according to the present embodiment, when the charging amount of the battery 3 becomes lower than the lower limit for start of forcible charging, the engine 1 is driven to start power generation by the generator 2.

In a case where the eco mode is selected and the charging amount of the battery 3 exceeds the first predetermined value (the silent mode allowable threshold) larger than the lower limit for start of forcible charging, more particularly, larger the second predetermined value (the silent mode cancellation threshold), selection of the silent mode is allowed. Here, it is considered that the silent mode is selected when the driver enters a residential area from a main road at the time when the driver heads to his or her house. Accordingly, when the first predetermined value (the silent mode allowable threshold) is set to be larger than the second predetermined value (the silent mode cancellation threshold), it is possible to reduce such a possibility that the silent mode is cancelled at the time when the driver reaches his or her house.

Further, when the charging amount of the battery 3 is below the second predetermined value (the silent mode cancellation threshold) larger than the lower limit for start of forcible charging in a state where the silent mode is selected, the silent mode is cancelled, and the eco mode is selected. Here, it is assumed that further stronger acceleration is requested when the charging amount of the battery 3 becomes lower than the second predetermined value (the silent mode cancellation threshold), and the silent mode is cancelled. In such an assumption, since the second predetermined value (the silent mode cancellation threshold) is larger than the lower limit for start of forcible charging, the charging amount does not become lower than the lower limit for start of forcible charging, so that the start of forcible charging by driving of the electric motor 4 is inhibited. This makes it possible to expect recovery of the charging amount by regenerative braking.

The embodiment of the present invention has been described above, but the embodiment just shows some applications of the present invention and is not intended to limit the technical scope of the present invention to the concrete configuration of the embodiment.

The invention claimed is:

1. A control method for a hybrid vehicle including a generator and an electric motor, the generator being configured to charge a battery by use of power of an engine, wherein the engine, the electric motor, and the battery are arranged in a series configuration such that the electric motor drives driving wheels by electric power of the battery and mechanical power from the engine is transferred to the generator rather than to the driving wheels, the control method comprising:
    accepting mode setting to set any of a normal mode, a regeneration driving mode, and a silent mode in accordance with an operation on a mode switch,
        the normal mode being a mode in which the battery is charged by charging by the generator by use of the power of the engine or by charging by a regenerative braking force in the electric motor,
        the regeneration driving mode being a mode in which the battery is charged by charging by use of the power of the engine similarly to the normal mode or by charging by a regenerative braking force larger than the regenerative braking force in the normal mode, whereby the regenerative braking force in the normal mode is inhibited relative to the regenerative braking force in the regeneration driving mode,
        the silent mode being a mode in which charging by use of the power of the engine is inhibited, wherein:
    when the normal mode is set, setting of the silent mode is not accepted; and
    when the regeneration driving mode is set, setting of the silent mode is accepted.

2. The control method for the hybrid vehicle, according to claim 1, further comprising:
    accepting mode setting to set a charge mode in which power generation is performed by the generator, wherein:
    when the normal mode is set, setting of the charge mode is not accepted; and
    when the regeneration driving mode is set, setting of the charge mode is accepted.

3. The control method for the hybrid vehicle, according to claim 1, wherein:
    the hybrid vehicle includes a brake pedal configured such that a stepping operation is assisted by negative pressure generated in an intake passage of the engine to restrain motoring of the engine and thereby maintain silence of the hybrid vehicle; and
    when generation of negative pressure to assist the brake pedal is required, the negative pressure is generated in the intake passage by performing a control such that the generator is driven by the battery to cause the engine to idle.

4. The control method for the hybrid vehicle, according to claim 1, wherein:
when a charging amount of the battery becomes lower than a lower limit, the engine is driven to charge the battery by the generator;
in a case where the regeneration driving mode is selected, when the charging amount exceeds a first predetermined value larger than the lower limit, selection of the silent mode is accepted; and
in a case where the silent mode is selected, when the charging amount is lower than a second predetermined value larger than the lower limit but smaller than the first predetermined value, the silent mode is cancelled, and the regeneration driving mode is set.

5. A control apparatus for a hybrid vehicle including a generator, an electric motor, and a mode switch, the generator being configured to charge a battery by use of power of an engine, wherein the engine, the electric motor, and the battery are arranged in a series configuration such that the electric motor drives driving wheels by electric power of the battery and mechanical power from the engine is transferred to the generator rather than to the driving wheels, the mode switch being configured to set an operation mode for the generator and the electric motor, wherein:
the control apparatus is configured to accept mode setting to set any of a normal mode, a regeneration driving mode, and a silent mode via an operation on the mode switch,
the normal mode being a mode in which the battery is charged by charging by the generator by use of the power of the engine or by charging by a regenerative braking force in the electric motor,
the regeneration driving mode being a mode in which the battery is charged by charging by use of the power of the engine similarly to the normal mode or by charging by a regenerative braking force larger than the regenerative braking force in the normal mode, whereby the regenerative braking force in the normal mode is inhibited relative to the regenerative braking force in the regeneration driving mode,
the silent mode being a mode in which charging by use of the power of the engine is inhibited;
when the normal mode is set, the control apparatus does not accept setting of the silent mode; and
when the regeneration driving mode is set, the control apparatus accepts setting of the silent mode.

6. The control apparatus for the hybrid vehicle, according to claim 5, wherein:
the control apparatus is configured to further accept setting of a charge mode in which power generation is performed by the generator in accordance with the mode setting;
when the normal mode is set, the control apparatus does not accept setting of the charge mode; and
when the regeneration driving mode is set, the control apparatus accepts setting of the charge mode.

7. The control apparatus for the hybrid vehicle, according to claim 5, wherein:
the hybrid vehicle includes a brake pedal configured such that a stepping operation is assisted by negative pressure generated in an intake passage of the engine; and
when generation of negative pressure to assist the brake pedal is required, the control apparatus performs a motoring control such that the generator is driven by the battery to cause the engine to idle so that the negative pressure is generated in the intake passage.

8. The control apparatus for the hybrid vehicle, according to claim 5, wherein:
when a charging amount of the battery becomes lower than a lower limit, the control apparatus drives the engine to charge the battery by the generator;
in a case where the regeneration driving mode is selected, when the charging amount exceeds a first predetermined value larger than the lower limit, the control apparatus accepts selection of the silent mode; and
in a case where the silent mode is selected, when the charging amount is lower than a second predetermined value larger than the lower limit but smaller than the first predetermined value, the control apparatus cancels the silent mode and sets the regeneration driving mode.

9. The control method for the hybrid vehicle, according to claim 1, further comprising receiving a signal, which is indicative of a selected driving mode, in a vehicle controller configured to prevent setting of the silent mode when the normal mode is set and accept setting of the silent mode when the regeneration driving mode is set.

10. The control method for the hybrid vehicle, according to claim 9, further comprising communicating the signal from the mode switch to the vehicle controller.

11. The control method for the hybrid vehicle, according to claim 9, wherein accepting a mode setting includes using an installed computer program on the vehicle controller to automatically prevent setting of the silent mode when the normal mode is set and automatically accept setting of the silent mode when the regeneration driving mode is set.

12. The control apparatus for the hybrid vehicle, according to claim 5, wherein the mode switch is located externally of the control apparatus.

13. The control apparatus for the hybrid vehicle, according to claim 5, wherein the control apparatus includes an installed computer program such that the control apparatus automatically prevents setting of the silent mode when the normal mode is set and automatically accepts setting of the silent mode when the regeneration driving mode is set.

* * * * *